(12) United States Patent
Lee

(10) Patent No.: US 7,073,058 B2
(45) Date of Patent: Jul. 4, 2006

(54) AUTHENTICATION SYSTEM FOR CONNECTING CLIENT TO SERVER PROVIDING PARTICULAR INFORMATION USING DEDICATED SYSTEM AND METHOD THEREFOR

(75) Inventor: Eun Seog Lee, Sampoong APT. 21-1102, 1685 Seocho-dong, Seocho-ku, Seoul (KR)

(73) Assignees: Tophead.Com, Seoul (KR); Eun Seog Lee, Seoul (KR)

( * ) Notice: Subject to any disclaimer, the term of this patent is extended or adjusted under 35 U.S.C. 154(b) by 849 days.

(21) Appl. No.: 09/890,257

(22) PCT Filed: Jun. 13, 2001

(86) PCT No.: PCT/KR01/01015

§ 371 (c)(1),
(2), (4) Date: Aug. 6, 2001

(87) PCT Pub. No.: WO01/96975

PCT Pub. Date: Dec. 20, 2001

(65) Prior Publication Data

US 2003/0172266 A1    Sep. 11, 2003

(30) Foreign Application Priority Data

Jun. 13, 2000    (KR)    ............................ 2000/32486

(51) Int. Cl.
*H04L 9/32*    (2006.01)

(52) U.S. Cl. ............................ 713/168; 713/2; 725/42
(58) Field of Classification Search ................ 713/168, 713/2; 725/42
See application file for complete search history.

(56) References Cited

U.S. PATENT DOCUMENTS

| 5,812,819 | A | * | 9/1998 | Rodwin et al. ............... 703/23 |
| 5,870,610 | A | * | 2/1999 | Beyda ........................ 717/173 |
| 5,959,623 | A | * | 9/1999 | van Hoff et al. ............ 715/719 |
| 6,032,257 | A | * | 2/2000 | Olarig et al. ................. 726/35 |
| 6,182,050 | B1 | * | 1/2001 | Ballard ........................ 705/14 |
| 6,263,447 | B1 | * | 7/2001 | French et al. .................. 726/5 |
| 6,654,886 | B1 | * | 11/2003 | Challener et al. ........... 713/172 |
| 6,724,403 | B1 | * | 4/2004 | Santoro et al. ............. 715/765 |

* cited by examiner

*Primary Examiner*—Emmanuel L. Moise
*Assistant Examiner*—Jeffrey Popham
(74) *Attorney, Agent, or Firm*—Rosenberg, Klein & Lee

(57) ABSTRACT

An authentication system and method therefor is provided, in which a dedicated system is installed to allow only a computer system which is monopolistically and exclusively supplied by a company operating an information providing server to be used to access the server. Here, the user computer includes an authentication system which generates a specific registration code for the system. The authentication system includes the user computer for generating a registration code for authenticating the user computer, and a system server which receives the registration code of the user computer and ascertains whether or not the user computer is registered.

4 Claims, 3 Drawing Sheets

AUTHENTICATION SYSTEM FOR CONNECTING CLIENT TO SERVER PROVIDING PARTICULAR INFORMATION USING DEDICATED SYSTEM AND METHOD THEREFOR

TECHNICAL FIELD

The present invention relates to an authentication system for connection to a server providing particular information using a dedicated system, and a method therefore. More particularly, the present invention is directed to an authentication system and method therefor, in which a dedicated system is installed to allow only a computer system which is monopolistically and exclusively supplied by a company operating an information providing server to be used to access the server providing particular information. In this system, a client computer system which is connected to a server providing information via the Internet for receiving desired information from the server, includes an authentication system which generates a specific registration code of the system, and that only a corresponding system can use information provided from the information providing server without limitation.

BACKGROUND ART

In general, a computer system is configured having a server connected by to a client via the Internet for providing information to the client, and a client is connected to the server via the Internet for receiving information from the server, in which the server is a dedicated server system and the client is a general PC.

In other words, a particular computer system is not required in order to utilize the Internet, but a computer system having a web browser as an Internet emulator can be connected with any computer system via the Internet to search for information.

In particular, in the case of a monitor which is in relation with the present invention, there are various types of monitors of various designs and models manufactured by various manufacturers. However, such various types of monitors do not have any individually particular functions other than a function of displaying user's work contents thereon.

Thus, assuming that an operator running an information providing server provides users with particular information either for pay or for free and covers the expenses necessary for operation of the information providing server system by incomes made via on-line advertisements, the users which become advertising objects should watch the advertisements provided by the system server. That is, when contents are provided to computer users via a monitor having a main screen and an auxiliary screen, a person providing internet content, that is, a system server operator provides the above monitors to users for free, to thereby enable the users to see advertisements displayed on the auxiliary screen of the monitor and the system server operator to obtain advertising income, in which case there are problems that the users should see the advertisements.

Meanwhile, a process must be provided for allowing users to access a particular information providing server and ascertaining whether he or she is a member who is allowed to access the server and obtain the particular information, or is to register as a member, in which a member ID (identification) and a secret number should be registered to utilize the content. The member registration method is performed by software. Even in the case that an advertising effect is maximized by using a monitor (hereinafter referred to as a double monitor) having a main screen and an auxiliary screen proposed in other patent applications filed by the same applicant, only a software member identification method cannot check whether users use the double monitors. As a result, various content cannot but be provided to users who use a general monitor from the system server.

Thus, users who use the above double monitor can see advertisements displayed on the auxiliary screen but users who use the general single monitor cannot see the advertisements since advertising content is not supplied to the users even though the users using the single monitor access the home page of the system server. Accordingly, the advertising can have no effect if it is not viewed.

DISCLOSURE OF THE INVENTION

To solve the above problems, it is an object of the present invention to provide an authentication system for connection to a server providing particular information using a dedicated system, and a method therefore. In the present invention users who access a system server providing particular information and desire to utilize a plurality of contents should use a particular monitor provided by the system server operator in order to receive information from the system server, to thereby maximize an advertising effect of the advertisements provided by the system server operator.

To accomplish the above object of the present invention, there is provided an authentication system for connection to a particular information providing server using a dedicated system. The authentication system includes at least one user computer connected to the Internet for generating a registration code, for authenticating the user computer, that is necessary for a log-in process in order to receive information having a particular format. The system further includes a system server which receives the registration code of the user computer and ascertains whether or not the user computer is registered, in the case where the system server is accessed by the user computer via the Internet.

According to another aspect of the present invention, there is also provided an authentication method for connection to a particular information providing server using a dedicated system. The authentication method includes the steps of generating a registration code for authenticating a user computer system if the user computer system is turned on and requesting each user computer connected to a system server to send a registration code, if a user computer accesses the system server providing particular information via the Internet, thereby checking whether the user computer adopts a dedicated system which can use information of the system server. The method further includes the step of providing information of the system server to the user computer after ascertaining whether or not the user computer adopts the dedicated system which can use the information of the system server.

The present invention having the above-described configuration adds a function of generating an authentication code for a user computer that accesses an information providing server, the server providing particular information and the user computer receives user desired information. As a result, information can be utilized with only a dedicated system provided by an information providing server operator, to thereby maximize an advertising effect by enhancing an efficiency of advertisement information included in the information being provided.

BRIEF DESCRIPTION OF THE DRAWINGS

The above object and other advantages of the present invention will become more apparent by describing the preferred embodiments thereof in more detail with reference to the accompanying drawings in which.

BEST MODE FOR CARRYING OUT THE INVENTION

Figure 1:
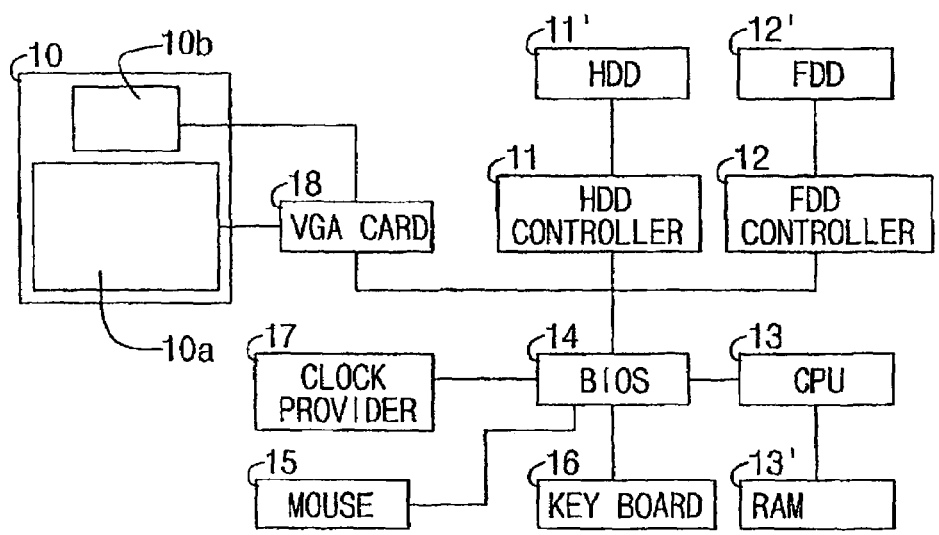
FIG. 1 is block diagram showing a system for explaining a PnP (plug and play) function of a PC (personal computer)

A preferred embodiment of the present invention will be described below with reference to the accompanying drawings.

Prior to describing an authentication system for connection to a server providing particular information by using a dedicated system, a plug and play (hereinafter referred to as PnP) function will be described below.

Since hardware devices which can be used in a PC are too diverse, it is not easy for general PC users to mount a hardware device in their own PCs and make the PCs operate normally. Thus, it has been difficult to mount a new device and add a new function in order to enhance a PC's performance without consulting on a specialist, but a PnP specification, which is a solution to solve the above problems, was developed and is being widely used.

A PnP concept was developed due to a structural weak point of a PC. That is, the existing PC has no functions relating to a series of automatic device settings. According to the PnP function, if a user mounts hardware devices in a PC, then the PC recognizes the hardware mounting and sets items necessary for operations of the hardware devices without any involvement of the user, and informs an operating system of the set information to allow application programs to use the devices, respectively.

Before the advent of the PnP function, no one among hardware devices, operating system, and application programs which operate in a PC could see what was installed in the PC. Also, users were not informed of a conflict where two kinds of hardware devices intend to use the same system resources, such as a memory and a DMA. Accordingly, users should know the conflict mechanism and investigate the reasons when a conflict occurs. For this reason, a user supporting cost will increase gradually in view of the PC industry.

A PnP function is a design concept and simultaneously a new specification with respect to a PC structure. A final target of the PnP function is to allow users to automatically set and use hardware devices without any interference once the hardware devices are mounted in a PC. That is, if a new device is mounted in a computer system, the computer system automatically sets an optimal state and enables application programs to use the newly set environment. To accomplish the above target, the following conditions should be considered in design.

In order to design a PnP function meeting the above conditions in a computer system, roles of all elements in the computer system such as a BIOS, an operating system, devices and device drivers, and how they perform mutual functions which relate to a system establishment process, should be definitely defined.

At a process of turning on a system and initializing the system, a BIOS should set a device outputting minimum characters, a device processing a user input, and a device loading an initial program on a memory and inform an operating system of information involved with the device nodes.

The operating system finds out all the device nodes in the system in addition to the devices set in the initial process and the resources required by the devices, and continues to perform a setting procedure.

In the case that a system configuration is changed, as in the case that a new device is mounted or the existing device is removed during operation of the system, a corresponding bus informs the operating system of the changed configuration in order to enable the operating system to perform a setting job necessary for the new configuration.

The application program should find out information on a newly added device in the system and any device removed from the system. The reason for finding out information on a removed device is because a service with respect to the removed device should not be requested.

The operational principle of the useful PnP function follows.

Referring to FIG. 1, if a PnP system in a PC is turned on, a BIOS 14 has an initiative according to a clock signal supplied from a clock provider 17, and investigates essential components such as a hard disc drive (HDD) 11' via a HDD controller 11, a floppy disc drive (FDD) 12' via a FDD controller 12, a VGA card 18, a mouse 15, a keyboard 16 and a monitor 10, and then activates the PC to operate, to then hand over a controlling right to an operating system (OS).

The BIOS 14 recognizes each of the above components according to a unique code recognizer perpetually recorded in an incorporated ROM and hands over the recognized results to the OS.

The OS investigates how many resources are required for what devices and determines what resources, for example, what interrupt (IRQ) functions and dynamic memory access (DMA) are assigned to each device according to the investigated results.

Finally, the OS searches for existence of device drivers for activating each device. If there is no device driver, the OS requests a user to install the device driver, while if there are device drivers, information with respect to the resources in use is handed over to the device drivers.

The drivers initialize each device and the system completes the booting process. Then, a CPU 13 fetches, processes and stores programs and data with respect to a RAM 13'.

The present invention uses a PnP function which automatically recognizes each device and drives the recognized device when new devices are added and booted in the system. The present invention will be described with an example of a double monitor 10.

As shown in FIG. 1, the double monitor 10 includes a main screen monitor 10a and an auxiliary screen monitor 10b. The VGA card 18 supplying video signals for the double monitor 10 can be configured as a single unit or two units.

The main screen monitor 10a in the double monitor 10 is a monitor on which main content processed by a user program are displayed and the auxiliary screen monitor 10b is a monitor on which a use environment indication and media indication of a user computer, a link (banner) linking web pages, advertisements and so on are displayed. The contents processed for the auxiliary screen monitor 10b are displayed while interlocking with the main screen monitor 10a.

Figure 2:
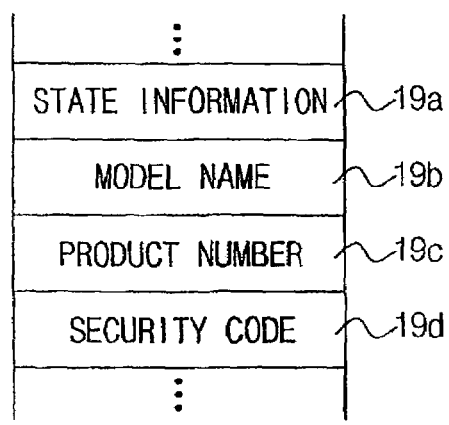
FIG. 2 is a diagram for explaining the structure of PnP data in a double monitor according to an embodiment of the present invention.

Meanwhile, PnP data recognized by the BIOS 14 via the VGA card 18 is displayed on the main screen monitor 10a and the auxiliary screen monitor 10b of the double monitor 10. As shown in FIG. 2, basic data with respect to state information 19a and a model name 19b is input as the PnP data. In the present invention, data such as a product number 19c and a security code 19d are added.

Here, the product number 19c is a product ID representing a characteristic of the double monitor 10. The security code 19d is set and used together with the product number 19c, in order to authentication data for the double monitor 10. That is, the above product number 19c and the security code 19d play the role of an ID and secret number (password), respectively.

The present invention inputs data capable of recognizing a characteristic of each monitor as PnP data of the double monitor 10, and utilizes the input data to authenticate the user computer. Thus, the product number 19c and the security code 19d are normally input as PnP data in each controller (not shown) for controlling a monitor such as the main screen monitor 10a and the auxiliary screen monitor 10b of the double monitor 10. However, as being the case, data of the product number 19c and the security code 19d can be additionally input into a single monitor, that is, into only the main screen monitor 10a as PnP data.

Figure 3:
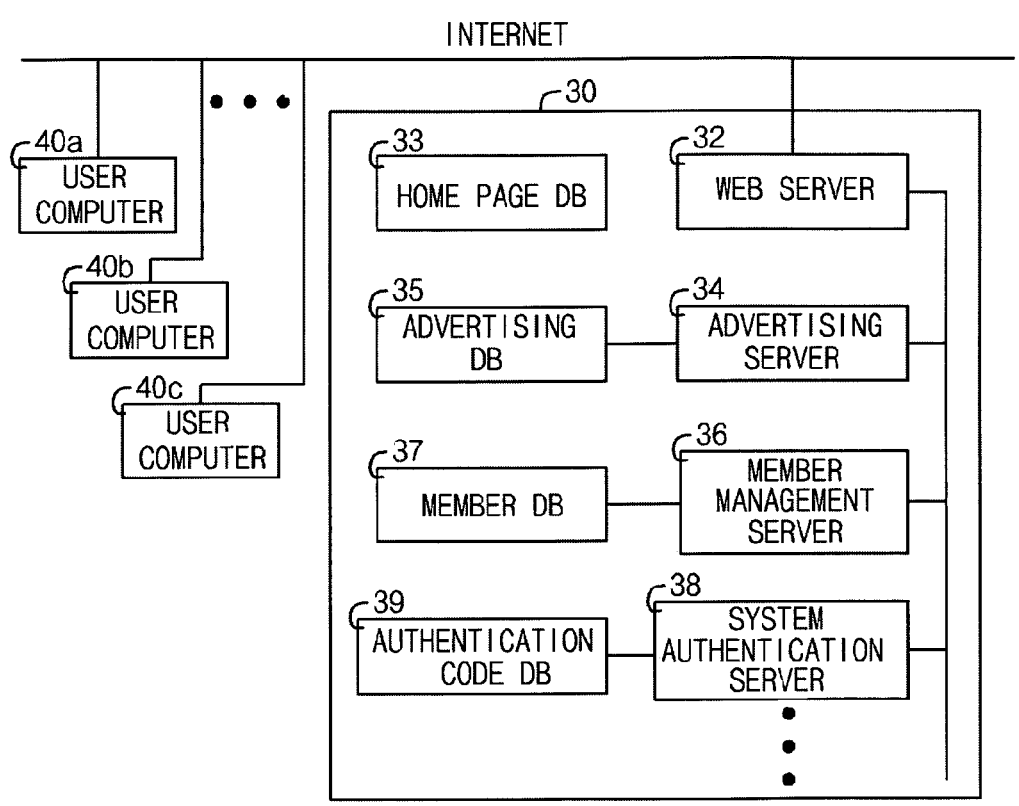
FIG. 3 is a block diagram showing a system for explaining an authentication system for connection to a server providing particular information using a dedicated system, according to the present invention.

As shown in FIG. 3, in order to administrate each double monitor 10 of a plurality of user computers 40a–40c, a system server 30 is configured as follows.

The system server 30 includes a member database (DB) 37 storing data of a plurality of users, a member management server 36 for performing member registration and management via the member DB 37, an advertising DB 35 storing advertising data displayed on an auxiliary screen of the double monitor, an advertising server 34 for managing the advertisements displayed on the double monitor according to the settings of an operator of the system server 30, a home page DB 33 storing data necessary for operation of the home page of the system server 30, and a web server 32 connecting the system server 30 to the Internet and managing the home page of the system server 30 In addition, the system server 30 includes an authentication code DB 39 storing authentication codes of the user computers, and a system authentication server 38 for managing the system authentication of the user computers.

Figure 4:
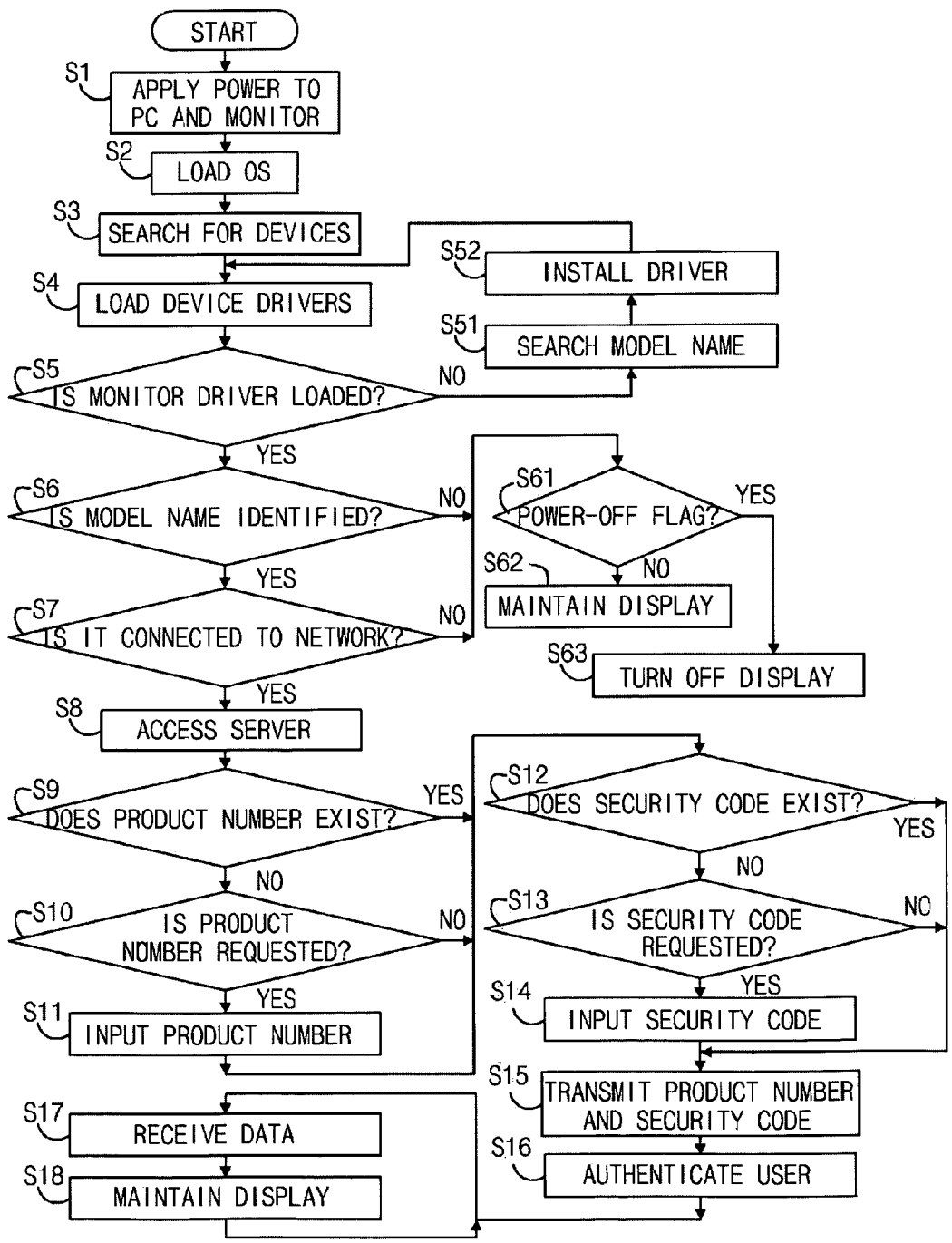
FIG. 4 is a flow-chart view for explaining an authentication method for connection to a server providing particular information using a dedicated system, according to the present invention.

The present invention having the above configuration will be described with reference to FIG. 4.

First, in order to perform the present invention, a double monitor 10, having a main screen monitor 10a and an auxiliary screen monitor 10b, should be connected with each of the user computers 40a–40c. Also, the PnP data of the double monitor 10 includes particular data capable of identifying a characteristic of the double monitor 10 such as the product number 19c and the security code 19d in addition to the existing state information 19a and the model name 19b, as shown in FIG. 2.

When power is supplied to the user computers 40a–40c, each to which a double monitor 10 is connected, and the double monitors 10 (S1), the BIOS 14 searches for the basic components as described above and enables the user computers to operate. Then, when an operating system is loaded into a main memory of each of the user computers (S2), the booted result is handed over to the operating system.

The operating system searches each device (S3), loads corresponding device drivers (S4), and ascertains whether the driver of the double monitor 10 is loaded (S5).

If the driver of the double monitor 10 is not loaded, the model name 19b is searched for via the PnP data of the double monitor 10 (S51), and the corresponding driver is installed (S52).

Meanwhile, if the monitor driver is loaded (S5) and then model name 19b is identified (S6), it is ascertained whether the user computers 40a–40c are connected to a network, that is, the Internet (S7). Then, the user computers 40a–40c are connected to the system server 30 providing contents which can be utilized via the double monitor 10 (S8).

Here, if the model name 19b is not identified or the computers are not connected to the Internet, at the process of identifying the model name 19b or identifying the network connection, respectively, the power supply state of the double monitor 10 is maintained in a turned-on state (S62) via a power-off flag (S61), or is converted into a turned-off state (S63).

Here, the power-off flag (S61) is a function added in a driver software program of the double monitor 10, for identifying the model name 19b of the double monitor 10 and the network connection thereof when the system operates, to thereby set the operation state of the double monitor 10.

When the user computers 40a–40c are connected to the system server 30 via the Internet, the system authentication server 38 identifies whether the product number 19c exists via the authentication code DB 39 (S9).

The product number 19c to be identified by the system server 38 is judged by identifying the PnP data of the double monitor 10 as shown in FIG. 2.

If the product number 19c does not exist in the result of identification of the product number 19c, the system authentication server 38 requests the user to send the product number 19c via the respective user computers 40a–40c (S10), and enables the user to directly input the product number 19c (S11).

If the product number 19c is automatically recognized at the process of identifying whether the product number 19c exists, it is ascertained again whether the security code 19d exists (S12).

Likewise, if the security code 19d does not exist, an input of the security code 19d is requested (S13), and the user is allowed to input the security code 19d (S14).

If the product number 19c and the security code 19d are identified or input via the above processes, the product number 19c and the security code 19d are transmitted to the system authentication server 38 (S15), and compared with the data stored in the authentication code DB 39. Accordingly, a user authentication procedure is passed through (S16).

After performing the user authentication procedure via the double monitor 10 as described above, the video signal data displayed on the auxiliary screen monitor 10b of the double monitor 10 is transmitted via the advertising server 34 (S17), and maintains the display state so that the content can be displayed on the double monitor 10 (S18).

At the user authentication step S16, a procedure for a member registration is preferably performed together with the registration of the product number 19c and the security code 19d with respect to the double monitor 10.

Meanwhile, in the embodiment of the present invention, the dedicated system according to the present invention is used as an example of use of the system server 30, in which case various content that is provided via the system server 30 can be utilized only when the user computer is identified via the product number 19c.

However, even in the case where a general monitor, rather then the double monitor, is used in a user computer, the user computer can restrictively utilize general information which is provided by the system server 30.

INDUSTRIAL APPLICABILITY

As described above, the present invention adds a function of generating an authentication code for a user computer which accesses a system server that provides content of particular information to the user computer. Accordingly, the content can only be completely used when a dedicated system, that has been provided by a system server operator, is used. However, the content can be restrictively used without using the dedicated system. As a result, information can be utilized with only a dedicated system provided by the system server operator, to thereby maximize an advertising effect by enhancing an efficiency of advertisement information included in the content provided via the system server.

In other words, the present invention is not limited in the above-described embodiment. It is apparent to one who is skilled in the art that there are many variations and modifications, without departing off the spirit of the present invention.

The invention claimed is:

1. An authentication system for connection to a particular information providing server using a dedicated system, the authentication system comprising:
at least one user computer connected to the Internet for generating a registration code for authenticating the user computer necessary for a log-in process in order to receive information having a particular format; and
a system server which receives the registration code of the user computer through the Internet and ascertains whether or not the user computer is authorized by a member identification and a password to receive specific content from said system server;
said computer including a basic input/output system for recognizing hardware devices and reading identification data therefrom, a dual screen display monitor and a driver for said dual screen display monitor, said dual screen display monitor having two independent display screens and identification data including a product number and a security code, said basic input/output system transferring said identification data to said driver and said driver establishing said registration code to include said product number as said member identification and said security code as said password said driver transmitting said registration code to said system server through the Internet;
said system server outputting said specific content to said user computer responsive to said system server authenticating said user computer and a subsequent request for content by said user computer, said specific content including a first portion of said specific content for unobstructed display on a primary screen of said two screens of said dual screen display monitor and a second portion of said specific content for simultaneous unobstructed display on an auxiliary screen of said two screens of said dual screen display monitor.

2. The authentication system of claim 1, wherein said system server comprises: a member database (DB) storing data of a plurality of users; a member management server for performing member registration and management via the member DB; an advertising DB storing advertising data displayed on said auxiliary screen of said dual screen display monitor; an advertising server for managing the advertising data according to settings of an operator of the system server; a home page DB storing data necessary for operation of the home page of the system server and displayed on said primary screen of said dual screen display monitor; and a web server connecting the system server to the Internet and managing the home page of the system server.

3. An authentication method for connection to a particular information providing server using a dedicated system, the authentication method comprising the steps of:
providing a dual screen display monitor to a user and connecting said dual screen display monitor to a user computer;
retrieving a product number and a security code from said dual screen display monitor during initialization of said user computer;
generating a registration code for authenticating said user computer system if the user computer system is turned on, said registration code being generated to include said product number as a member identification and said security code as a password;
sending said registration code to the information providing server via the Internet, thereby checking whether the user computer is registered to receive information of a system server for simultaneous unobstructed display on two display screens of said dual screen display monitor; and
providing information from the system server to the user computer after ascertaining whether or not the user computer adopts the dedicated system which can use the information of the system server responsive to a request therefrom subsequent to registration of said user computer being confirmed and displaying a first portion of said information on a primary display screen of said dual screen display monitor and displaying a second portion of said information on an auxiliary display screen of said dual screen display monitor.

4. The authentication method of claim 3, wherein said registration code includes the step of using said registration code further comprises a product number and a security code as plug and play data which is used in order to automatically install a driver for each device of the user computer, in said registration code generation step said dual screen display monitor.

* * * * *